United States Patent [19]

Henson et al.

[11] 4,417,625
[45] Nov. 29, 1983

[54] ANNULUS PLUGGING

[75] Inventors: George S. Henson, Grange-over-Sands; Joe Brooks, Emsworth, both of England

[73] Assignee: Mobell Blowout Services Limited, Dyce, Scotland

[21] Appl. No.: 239,108

[22] Filed: Feb. 27, 1981

[30] Foreign Application Priority Data

Mar. 3, 1980 [GB] United Kingdom ............... 8007108
Jul. 14, 1980 [GB] United Kingdom ............... 8022921

[51] Int. Cl.³ ............................................. F21B 33/13
[52] U.S. Cl. ................................... 166/387; 166/285; 166/288; 166/292; 166/295
[58] Field of Search ............... 166/285, 287, 288, 292, 166/295, 363, 364, 387; 264/36, 262

[56] References Cited

U.S. PATENT DOCUMENTS

| 1,879,160 | 9/1932 | Fowzer | 169/46 |
| 2,708,973 | 5/1955 | Twining | 166/285 |
| 3,064,734 | 11/1962 | Toelke | 166/63 |
| 3,144,049 | 8/1964 | Ginsburgh | 166/284 X |
| 3,265,782 | 8/1966 | Rosengarten, Jr. et al. | 264/36 X |
| 3,277,964 | 10/1966 | Houpeurt et al. | 166/285 |
| 3,368,005 | 2/1968 | Buczala et al. | 264/262 X |
| 3,603,398 | 9/1971 | Hutchison et al. | 166/285 X |
| 3,631,928 | 1/1972 | Dalzell | 166/285 |
| 3,647,000 | 3/1972 | Rowley et al. | 166/285 |
| 3,717,202 | 2/1973 | Burrow | 166/55 |
| 3,720,260 | 3/1973 | Duck et al. | 166/336 |
| 3,738,424 | 6/1973 | Osmun | 166/298 |
| 3,993,137 | 11/1976 | Heftz | 169/46 |

FOREIGN PATENT DOCUMENTS

| 1232480 | 10/1960 | France . |
| 2194206 | 2/1974 | France . |
| 2418172 | 9/1979 | France . |
| 2001378 | 1/1979 | United Kingdom . |
| 2057534 | 4/1981 | United Kingdom . |

Primary Examiner—Ernest R. Purser
Assistant Examiner—Thuy M. Bui
Attorney, Agent, or Firm—Wenderoth, Lind & Ponack

[57] ABSTRACT

A method of plugging an elongate annulus, particularly an annulus in an oil well in which a blow-out is occurring, consists in the steps of securing hot tapping apparatus to an outer tubular member within which the annulus is situated; forming a hot tapping in the outer tubular member; injecting, through the hot tapping and into the annulus, curable synthetic material; and allowing the curable synthetic material to cure in the annulus and form a pressure resistant plug therein.

The curable synthetic material may be injected with injection apparatus having an injection barrel movable in a support, the support being sealable to the hot tapping, means for axially moving the barrel in the support and means for metering and feeding plugging material from the barrel into the annulus.

22 Claims, 6 Drawing Figures

ANNULUS PLUGGING

BACKGROUND OF THE INVENTION

The present invention relates to a method of plugging an elongate annulus. The method is particularly, though not exclusively, suited to assist recovery of control of a well for hydrocarbons following a "blow-out", the annulus then being between two tubulars in the well.

A typical well in the North Sea comprises a 30" diameter outer tubular, known as a conductor, with 20", 13⅜" and 9⅝" inner tubulars known as casings, arranged within each other inside the conductor. Inside the 9⅝" tubular, known as the production casing, there may be present during a blow-out either no further tubular, or 7" production tubing or other tubing or a drill string for example. The blocking of a blowing stream in a central tubular has been the subject of prior proposals, for example as described in U.S. Pat. No. 3,647,000, in which crimping of the tubing is disclosed to be followed by the injection up-stream of the crimp of solid particulate material which lodges at the crimp and blocks the tubing. Another proposal has been that a blowing annulus—between two tubulars—be blocked by lodging at a collar steel chain having cast on rubber balls. However, sealing onto an outer tubular, plugging a non-blowing but possibly pressurised annulus within the outer tubular, and reaching on through to block the central blowing tubular without breaking the outer seals, has not been considered previously.

As is described in our earlier British patent application No. 7,926,138—from which our British patent application No. 8,022,921 claims priority and which also describes apparatus for use in underwater blow-out control by effecting side entry—control operations may be started by cutting access windows in the 30" conductor and at least the outer casing with explosive charges.

However, to cut an access window by any method in the 9⅝" production casing may well be an unacceptable risk and both the annulus and the production tubing must be plugged and blocked with plugging and blocking material being passed through apparatus sealed onto the casing. For example, when blow-out control operations are started and the 9⅝" casing is hot-tapped pressure may be found in the annulus which cannot be bled off. Even if there is no annulus pressure initially, when the blowing production tubing is blocked and pressure builds up behind the block, then pressure comes on to down hole seals which may break down. Further, on blocking of the production tubing it may fail as a result of having been eroded and weakened. Thereafter, in either case, pressure will rise in the annulus, which pressure will not be contained by proven seals and an underwater blow-out will be likely to follow, unless steps disclosed below are taken. Thus if an access window is cut in the production casing to regain control of a platform blow-out or one occurring at the sea surface, if the platform has burnt out, there is a significant risk of worsening the situation by creating an underwater blow-out at the access window. The risk of this outcome may not be acceptable.

OBJECT AND SUMMARY OF THE INVENTION

The invention has been conceived so that pressure integrity of the production casing may be preserved and both an annulus plug and a tubing block be formed.

According to one aspect of the invention there is provided a method of forming a pressure resistant plug in an elongate annulus within an outer tubular member consisting in the steps of securing hot tapping apparatus to the outer tubular member; forming a hot tapping in the outer tubular member; injecting, through the hot tapping and into the annulus, curable synthetic material; and allowing the curable synthetic material to cure in the annulus.

Where the tubular members are oriented so that the curable synthetic material flows along the annulus on injection or there is existing flow in the annulus, foundation material may be injected prior to injection of the curable synthetic material for the latter material to rest against on its injection, the foundation material lodging against a partial obstruction of the annulus.

Preferably the foundation material is solid particulate material. However it may be quicksetting material which is mixed on injection. To aid lodging, the quickset material may be such as to expand as it sets.

Although initially conceived for plugging the inner annulus between the production casing and the production tubing of an oil well, the plugging method of the invention may be employed for an outer or an intermediate annulus or indeed for an annulus other than an oil well annulus. In the case of a blowing oil well, the inner annulus may be full of a static fluid such as a diesel-water mixture or drilling mud or alternatively the inner annulus may be blowing. In the former case the particulate material will usually have such a density as to sink through the fluid down to the partial obstruction. Alternatively with heavy drilling mud and where the annulus is blowing the particulate material will rise to the partial obstruction. If quicksetting material is used, this also may have a density such as to rise or fall according to the fluid in the annulus.

During injection of synthetic material into the annulus two components of the material may be mixed, typically where the synthetic material is such as to cure shortly after mixing. Alternatively, where the synthetic material is to be cured by heat from the production tubing and flowing hydrocarbons, the material may be prepared in advance of injection.

Preferably the particulate material comprises balls of varying sizes, the largest diameter balls being injected first followed by balls of decreasing diameter. Preferably the largest diameter balls are of sufficient size to lock the two tubular members against mutual movement. Conveniently steel balls may be used where they are to fall to the partial obstruction and balls of a lower density material or hollow balls may be used where they are to rise to the partial obstruction. Normally the partial obstruction in the annulus will be a collar which is used to join sections of the inner tubular member.

In case for any reason the metal balls do not lock the two tubular members against mutual movement, the nature of the synthetic material may be adjusted to progressively jellify without the formation of voids or micro-annuli during curing. As curing progresses, the material progressively dampens out the mutual movement and on final curing the tubular members are locked together.

The balls of varying sized may be supplemented by fibrous metal material for example graded brass swarf, or fibrous steel consisting of fibres ¼" long by 1/32" in diameter to improve the barrier against which the synthetic material rests and cures.

A variety of options are envisaged for the material of that part of the synthetic material immediately adjacent the particulate material. For instance fibrous metal or lost circulation material may be incorporated in the synthetic material to obviate any tendency for the synthetic material to percolate through the particulate material. Lost circulation materials are used by oil well drillers to seal porous strata for example through which drilling mud circulation is being lost. It is envisaged that a bottom reservoir of lost circulation material, possibly a 50/50 mixture of nut plug and coarse mica flakes mobilised in a jellatinous cream, may be injected prior to the synthetic materials to block any micro-annuli which may form, as explained in more detail below. Further, or alternatively, lost circulation material, further synthetic material or a mixture of both may be injected after the synthetic material plug has cured to prestress the plug. This is an important feature.

Without prestressing there is a danger that if and when the annulus becomes pressurised a micro-annulus may be formed along the inner or outer circumference of the cured plug, due to compression of the plug. Prestressing is effected by injection under pressure, preferably to the well pressure with which the annulus may be pressurised, possibly 5000 psi. An indication that a sufficient second injection has been made can be achieved from resistance experienced to continuing injection. Once further injection can only be effected at excessive pressure, one may be confident that the plug is is adequately prestressed and that it will withstand subsequently arising pressures. Such pressure may arise in the annulus through failure of down hole seals or the inner tubular member or through leakage at a hot tap made in the inner member for a subsequent operation to block it.

The synthetic material may comprise various curable resins, gels and elastomers. THe individual materials, and mixtures thereof, will be chosen according to prevailing circumstances. For instance polyamides may be used, but the material most likely to be used is a plasticised epoxy resin material.

For injection of the above mentioned plugging materials a hot tapping is cut in the outer of the two tubular members, e.g. the production casing, at a sufficient height above a collar (where the annulus contents are of sufficiently low density) for the particulate material to settle around the annulus at the collar. When the epoxy resin is injected, sufficient is used to form a plug which extends an appreciable distance up the annulus above the hot tapping. To ensure that the plug is of sufficient length, a spring loaded pressure relief valve may be positioned where a second hot tapping is to be made and injection of the resin material continued at least until it extrudes at the relief valve. The relief valve will be positioned such that the annulus plug extends from the collar supporting the foundation material up past a second collar. This provides added security against the plug being blown up the annulus in the event of the annulus becoming pressurised, since the plug would lodge against the second collar if displaced.

For blocking off the production tubing, where this is the inner of the two tubular members, after curing of the epoxy resin, the production tubing and the epoxy resin are preferably bored through at the first hot tapping for injection of blocking material. The second hot tapping through the outer tubular member is enlarged and continued through the cured epoxy resin in the annulus and the central tubing. Then a "through-bar" is inserted across the central tubing at the second hot tapping and blocking material is injected at the first hot tapping.

The blocking materials are injected in sequence in a manner analogous to the injection of the annulus plugging materials. However, the characteristics of the materials have to be matched to the flow conditions occurring at particular stages in blocking of the tubing.

Initially the injected materials have to be capable of lodging on the through-bar under conditions of high flow rate. As the block builds up, the pressure builds up correspondingly to compact the blocking materials but the oil flow rate is reducing and with it the ability of the flow to carry up blocking materials to the block. Generally speaking, the initial blocking materials are larger, heavier, denser and stronger than succeeding materials. There may be exceptions to this, for instance when the oil flow rate is very high it is necessary to cushion the impact of the heavy materials with hard plastics e.g. nylon balls. These are followed by steel or aluminium balls which lodge against the through-bar, the initial nylon balls being ultimately squeezed past the through-bar. Subsequently a combination of nylon net and nylon balls are injected followed by finer material which may include rubber string and lost circulation material. These subsequent materials require a low enough density to ensure that they float into position as the flow is blocked off, in practice organic materials are used for this.

When the production tubing has been blocked, any possible blow-out to the annulus at the upper hot tap is blocked since the tubing is blocked below the upper hot tap.

For forming the hot tapping prior to injection, the hot tapping apparatus preferably comprises a boring machine and a tool holder having a central bore, being adapted for detachable sealing connection of the boring machine and then an injection tool to the tool holder at one end of the bore and having a face at the other end of the bore adapted for sealing abutment with the outer tubular member, a saddle seal surrounding the said other end of the bore and a valve for closing off the tool. For the operation of hot tapping the tool holder is secured to the outer tubular member with the saddle seal sealing the said other end of the bore to the outer tubular member. The valve is opened. The boring machine is operated to advance a cutter through the bore to cut the hot tapping in the outer tubular member and to withdraw the cutter. The valve is closed. The boring machine is detached and replaced by the injection tool. The valve is opened and the curable synthetic material is injected from the injection tool into the annulus.

According to another aspect of the invention there is provided injection apparatus for injecting plugging material into an annulus within an outer tubular member via a hot tapping in the outer tubular member, the apparatus comprising an injection barrel, a barrel support in which the barrel is axially movable and which is sealable to the hot tapping, means for axially moving the barrel in the support and metering means for feeding plugging material from the barrel into the annulus.

Prefereably the injection apparatus includes one or more curable synthetic material reservoirs attached to the barrel support, the metering means being arranged to feed the curable synthetic material from the reservoirs to the rear end of the barrel and into the annulus. Where the synthetic material is to be mixed during injection two or more reservoirs for individual components of the synthetic material and a mixer may be provided, with the metering means being adapted to feed the individual components in metered amounts to the mixer.

Preferably the barrel support is adapted for connection to a tool holder as described in our earlier British patent application No. 8,022,921. The means for axially moving the barrel may include a hydraulic piston and cylinder arrangement or may be provided by a mechanical feed screw. Normally the barrel will be of sufficient length to enter the annulus to be plugged. In this case its forward end may be configured to push the production tubing to the opposite side of the casing whilst permitting the plugging materials to be injected from the forward end which may still be in contact with the tubing. The ability to push the production tubing for widening the annulus at the hot tapping by use of a configured forward end is a valuable precaution even although a preliminary radiographic survey will have provided data to assist entry at the wider part of the annulus.

The mixer, which may be a plate homogenizer, is conveniently positioned in the rear end of the barrel connected to the reservoirs by flexible pipes.

The metering means may include a pair of gear pumps feeding metered amounts of liquid, such as sea water, to the reservoirs and forcing the synthetic material components out to the mixer. A piston or diaphragm is provided in each reservoir to keep the components separate from the sea water. To facilitate metering the gear pumps may be ganged together and driven from a common motor to ensure that they feed the individual components in the required amounts for the synthetic material to cure satisfactorily.

Prior to injection the barrel may be charged with particulate plugging material, duly separated along the length of the barrel by sealing pistons preventing the individual types of particulate material from mixing prior to injection. The sealing pistons are preferably of a soft, flexible, frangible material such as not to obstruct the fall or rise of the particulate material towards the place of lodgement.

BRIEF DESCRIPTION OF THE DRAWINGS

To help understanding of the invention, a specific embodiment thereof will now be described with reference to the accompanying drawings in which.

DETAILED DESCRIPTION OF THE PREFERRED EMBODIMENT

Figure 1:
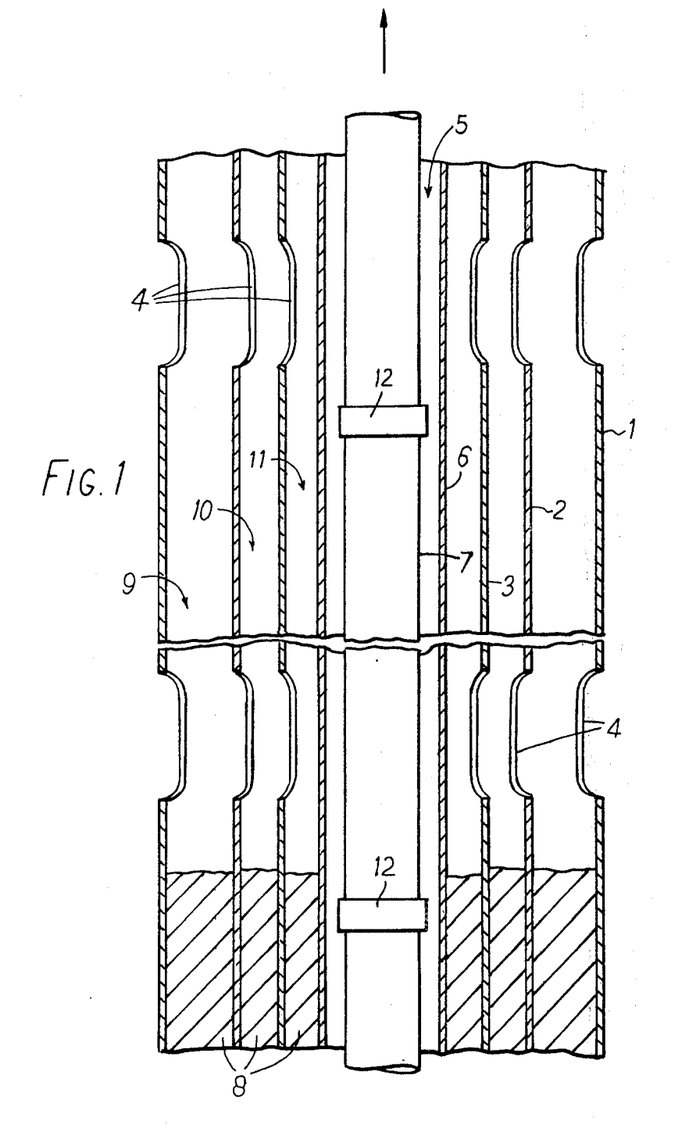
FIG. 1 is a part-sectional side view of a portion of an oil well.

FIG. 1 shows the condition of an outer 30" conductor 1, the 20" casing 2 and the 13⅜" casing 3 with access windows 4 cut therein with explosive charges in preparation for blocking of the inner annulus 5 between the 9⅝" production casing 6 and the 7" central, production tubing 7. As the access windows have been cut grout 8 has been pumped into the outer annuli 9, 10 and 11 to stabilise the conductor and casings. Collars 12 between individual sections of the 7" production tubing 7, against which material for plugging the inner annulus 5 can lodge, can be seen in FIG. 1. The collars are 40' apart.

Figure 2:
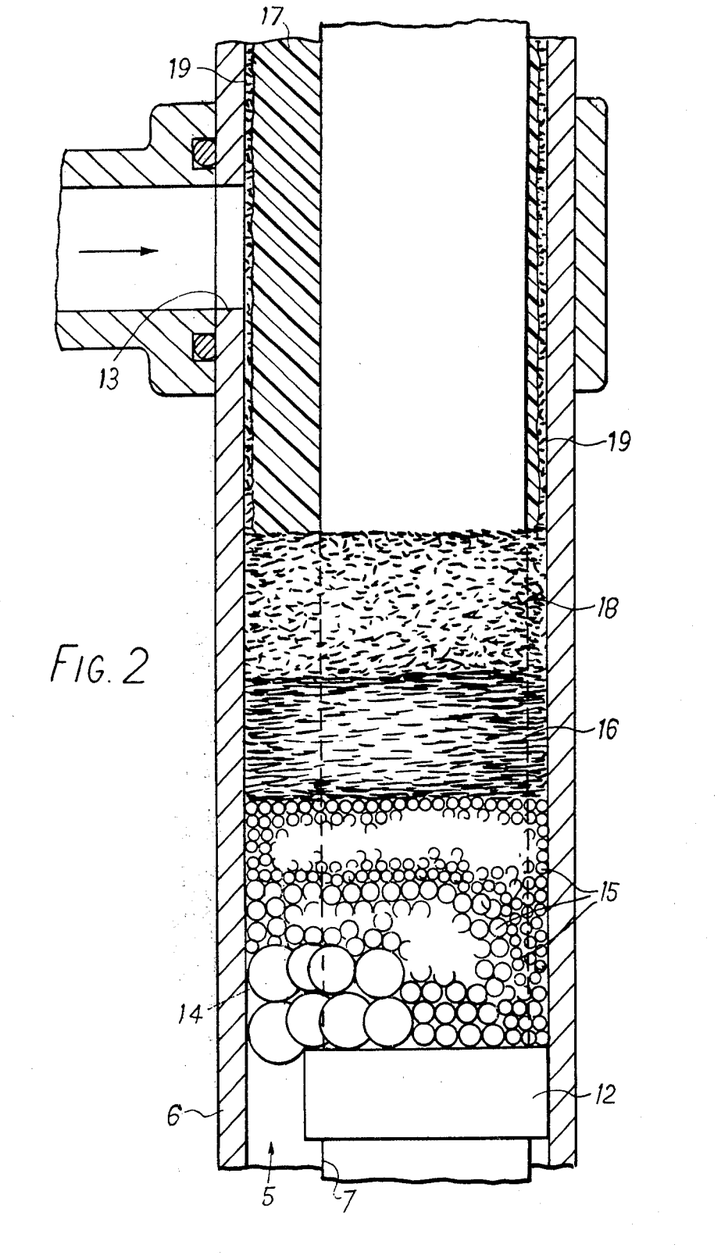
FIG. 2 is a diagrammatic side view of the inner annulus of the well being plugged.

FIG. 2 shows the inner annulus 5 in more detail with plugging materials injected through a lower hot tapping 13 for which lower ones of the windows provide access to 9⅝" casing 6.

Figure 6:
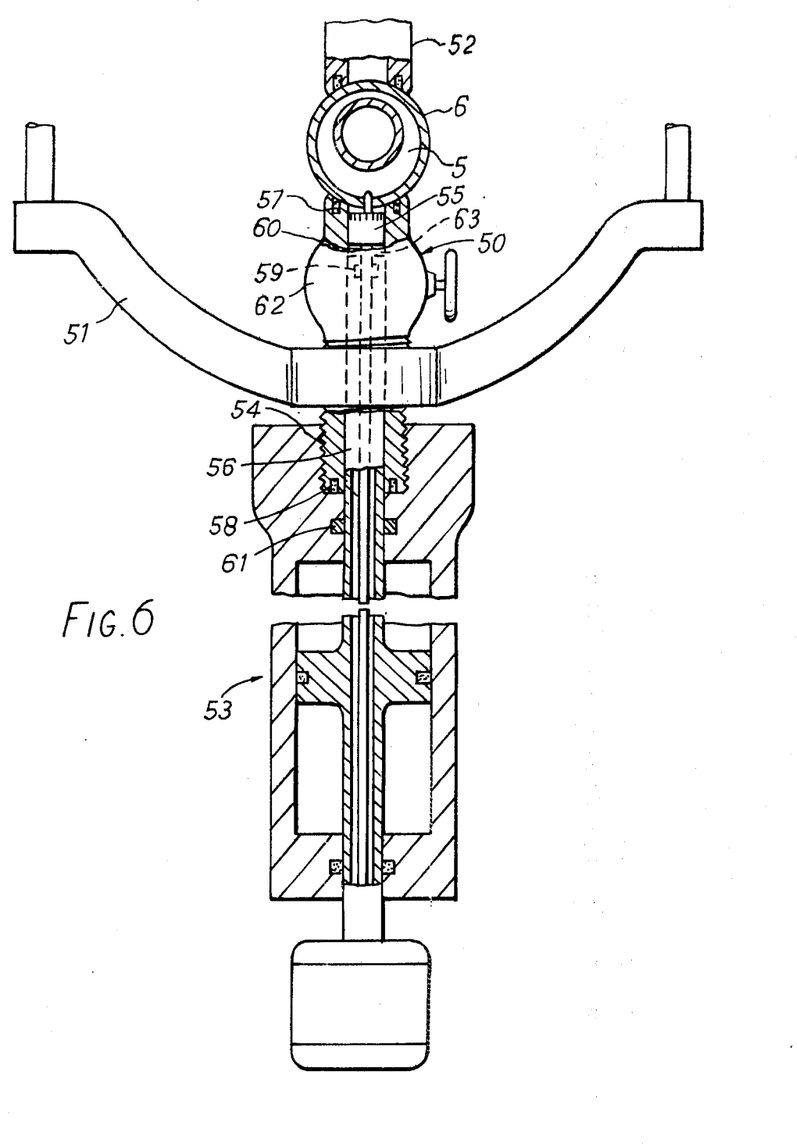
FIG. 6 is a plan view of a two part hot tapping tool in operation.

The operation of hot tapping involves forming the aperture known as the hot tapping in a casing, for example, under conditions such that no leakage flow from the hot tapping can escape. This involves sealing the apparatus used in the hot tapping operation to the casing, and providing the apparatus with internal seals to prevent leakage therefrom. Normally hot tapping apparatus also includes a valve for closing off the hot tapping once formed. The hot tapping apparatus used to form the hot tapping 13 may be a two-part tool adapted for tapping and injection as described in our patent British application No. 8,022,921. FIG. 6 shows this tool in use performing a hot tapping operation on the casing 6. A tool holder 50 is clamped via arm 51 and a back-up unit 52 to the casing 6. A boring machine 53 is screwedly attached to the tool holder 50 at screw thread 54. The boring machine has a cutter 55 bearingly supported at the forward end of a rod 56. The following seals are effective at retaining any pressure inside the annulus 5.

(i) Saddle seal 57 in the forward end of the tool holder 50 confronting the casing 6.
  (ii) Face seal 58 in the rear end of the tool holder 50 abutting the boring machine 53.
  (iii) Seal 59 between cutter spindle 60 and rod 56.
  (iv) Seal 61 between the rod 56 and the body of the boring machine 53.

The tool holder has a valve 62 for closing its bore 63 on withdrawal of the cutter 55 and detachment of the boring machine 53.

Referring again to FIG. 2, the 9⅝" casing 6 has a wall thickness of approximately ½" and the collars 12 stand ¼" proud of the 7" production tubing 7. With the 7" tubing collar 12 lying against the side of the 9⅝" casing approximately opposite from the tapping 13, the maximum gap on the tapping side between the collars and the casing is 1⅛" and the maximum width of the annulus is 1⅜". For this situation 1¼" balls 14 are initially injected to fall onto the collar below the tapping 13 and where they act to lock the 7" tubing 7 and 9⅝" casing 6 together. This locking is important since it is likely that the 7" tubing will be vibrating. Before a satisfactory plug can be formed relative movement between the 9⅝" casing and the 7" tubing must be reduced to a small figure. Considerable spaces remaining unfilled by the first balls are filled by further injection of successively smaller balls 15. Balls of below a certain size will fall too slowly on account of the viscosity of the mud. The plug is continued with injection of fibrous metal material 16 typically brass swarf, which forms a mat on top of the balls. A plasticized epoxy resinous material 17 may be injected immediately onto the fibrous metal mat. However, should the inner annulus 5 become pressurised due to failure of the 7" tubing 7 or the down hold seals when it is blocked off, there may be a tendency for pressurised liquid in the annulus to seep along the edge of the resin plug and form a "micro-annulus" due to shrinkage of the resin which may take place on curing and/or pressurisation. To prevent flow occurring in the micro annulus a bottom reservoir 18 of lost circulation material may be injected onto the fibrous metal mat prior to the epoxy resin 17, the lost circulation material working its way into the micro-annulus as it forms. This is shown at 19 in FIG. 2. Alternatively, the lost circulation material and/or further epoxy resin may be injected at 13 after the epoxy resin has cured. The purpose of this additional injection is to seal any cracks which may be present in the cured resin and to prestress it, to obviate the possibility of its shrinking under well pressure. If the second injection is made at a pressure in excess of that to be expected when the full well pressure is applied to the plug on blocking of the production tubing, its effectiveness can be predicted.

Figure 3:
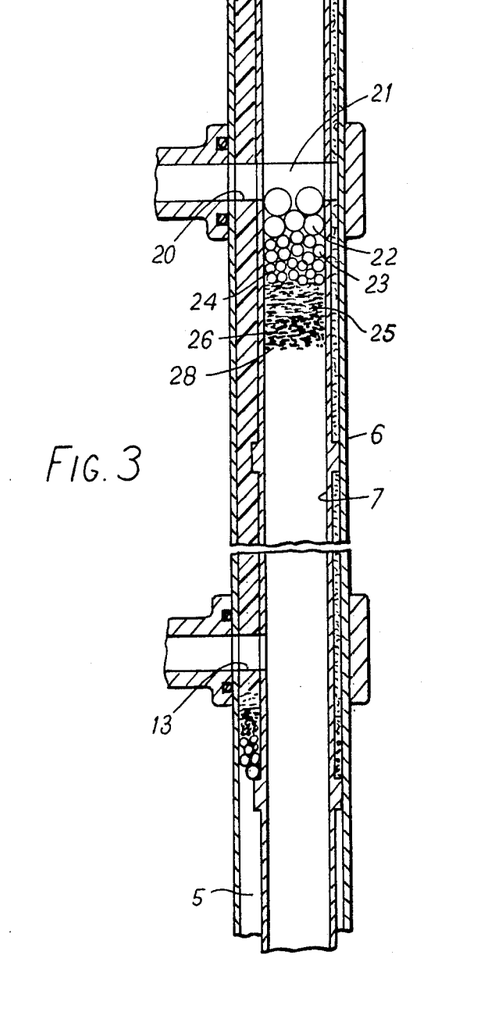
FIG. 3 is a diagrammatic side view of the central tubing being blocked.

When the annulus 5 has been plugged and the epoxy resin plug has been cured, see FIG. 3, an upper hot tapping 20 is made through the 9⅝" casing, the epoxy resin plug (sufficent resin having been inserted to ensure that the plug extends up to the upper hot tapping 20) and 7" production tubing. The tapping terminates in the resin plug opposite the point of entry. Through this tapping a through-bar 21 will be inserted across the production tubing via which the well is blowing, the through-bar being engaged in both sides of the central tubing. Prior to insertion of the through-bar 21 the lower tapping 13 is extended through the resin and into the 7" production tubing. Once the tool at the lower tapping has been prepared for injection of blocking material the through-bar is inserted. It may be subjected to rapid erosion by sand entrained in the blowing flow of hydrocarbons so that balls and other material must be injected without delay. Alternatively, at low flow rates only the first injected material can significantly exceed the density of oil. Then the sequence may be: aluminium balls 22, which may be 2" in diameter—with a 2¾" bar and 6" internal diameter to the 7" tubing—and may have a thin rubber coating to aid their lodging at the through-bar, are injected followed by 1" diameter wooden balls 23, which ultimately splinter and work their way through the aluminium balls when the pressure comes on. The balls remain intact long enough to provide support for the next injected nylon net interconnecting rubber covered nylon balls 24. Subsequent injections of more nylon net 25, rubber string 26 and lost circulation material 28 complete the block in the production tubing. It is at this point that the pressure rises in the production tubing, possibly to 5,000 psi, and a blow-out might initiate through the inner annulus in the absence of the annulus plug. Prestressing of the latter at the lower hot tapping enables it to resist this pressure. The well is now ready to be killed by pumping mud in through the lower hot tapping 13.

It is envisaged that situations other than that described above, i.e., 7" tubing blowing and 7"-9⅝" annulus static, may be encountered. For instance, the 7"-9⅝" annulus may be blowing. In this instance, the 7"-9⅝" annulus plug would be formed with the plugging materials being carried up by the flow. The 9⅝"-13⅜" annulus may have to be hot tapped (because of the history of the well) and may not be satisfactorily bled off. Hence this annulus may require plugging. This can be done in a similar manner to that described above.

Figure 4:
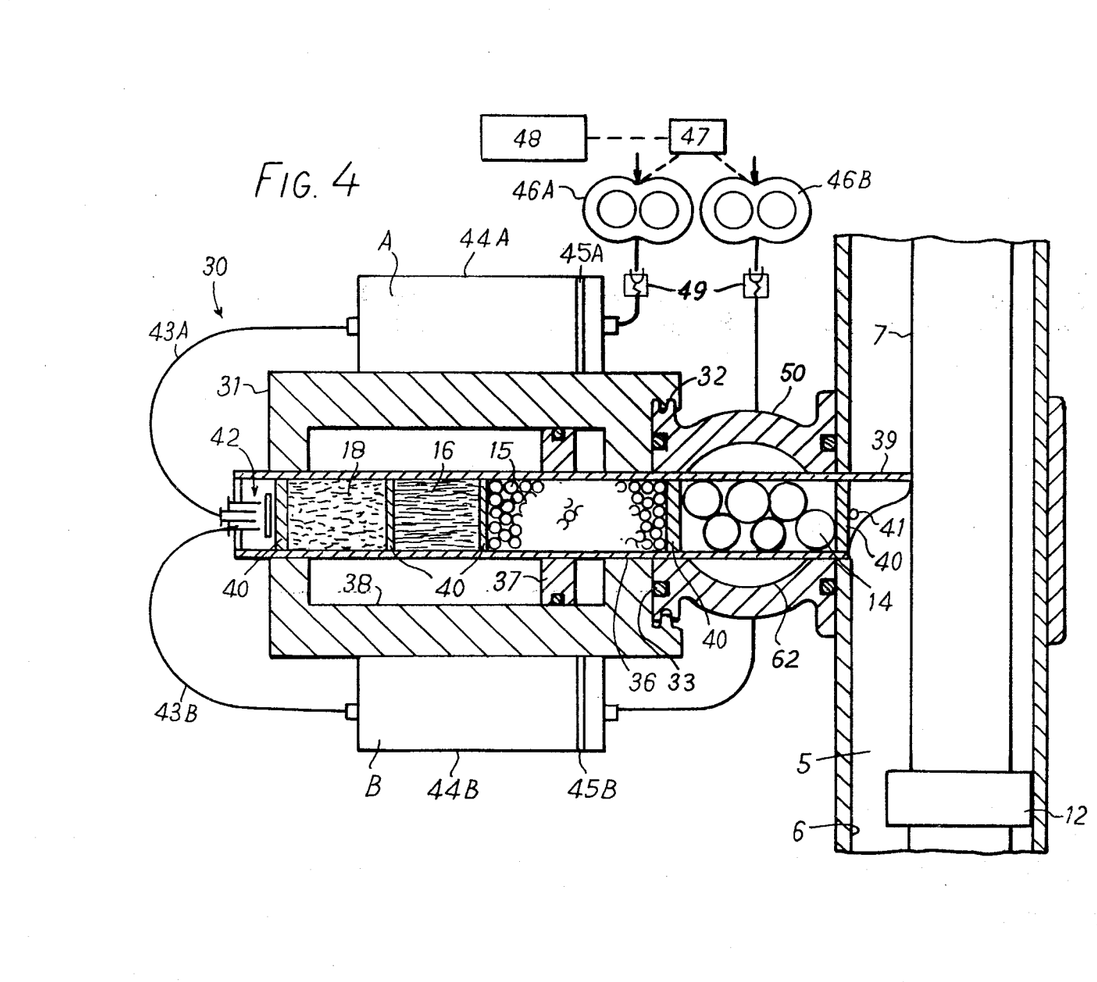
FIG. 4 is a cross-sectional side view of an annulus-plugging-material injector.
Figure 5:
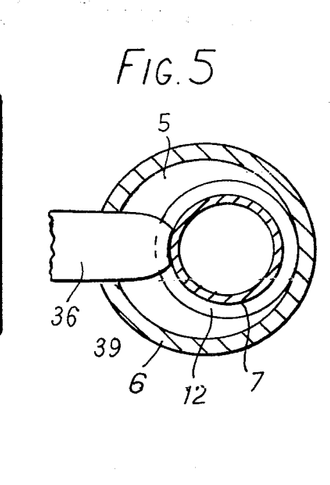
FIG. 5 is a scrap plan view of the annulus of FIG. 4 to be plugged.

FIG. 4 shows an injector 30 in readiness to inject plugging material into the annulus 5. The injector has a barrel support 31 connected by a quick release threaded coupling 32 and sealed by a face seal 33 to a tool holder 50 of FIG. 6. Prior to connection of the injector the hot tapping 13 was bored, the ball valve 62 closed and the boring machine removed. Then with the injector connected, the ball valve 62 was opened and a barrel 36 of the injector fed through hot tapping 13 into annulus 5. A double acting piston 37 in a cylinder 38 is provided for moving the barrel. The top of the forward end 39 of the barrel is scalloped in plan, see FIG. 5, to enable the barrel to engage the production tubing and urge it across the annulus until its collars 12 lie against the 9⅝" casing 6.

The bottom of the forward end of the barrel is also cut away at its underside to allow plugging material to flow freely from the barrel into the annulus 5. Prior to connection, the barrel is charged with foundation material such as 1¼" balls 14, smaller balls 15, fibrous metal 16, and mobilized jellatinous nut plug/mica lost circulation material 18. Each material is separated from its neighbouring material by a disc piston 40, the piston at the forward end being held in place by a frangible pin 41.

At the rear end of the barrel a disc homogeniser 42 is provided for mixing the two reactive components A, B of the epoxy resin by squirting the components in two concentric jets onto the mixing disc. The components are fed to the barrel by flexible hoses $43_A$, $43_B$ from reservoirs $44_A$, $44_B$. These are in the form of cylinders having pistons $45_A$, $45_B$ for driving the components A, B into the barrel. The gear pumps $46_A$, $46_B$ are drivable at a predetermined speed ratio to give a predetermined displacement ratio, hence mixture ratios of the components A, D, via a gear-box 47 by a motor 48 pump sea water in behind the pistons $45_A$, $45_B$ for injection. Pressure on the injector may rise when the valve 62 in the tool holder is opened. To contain this pressure, non return valves 49 are provided between the pumps $46_A$, $46_B$ and the barrel 36.

Once the barrel is in position for injection the motor 48 is started and the pistons 45, $45_B$ moved forwards. As the epoxy resin is mixed it forces the particulate plugging material into the annulus 5 (the pin 41 breaking in the process). The speed of the motor can be controlled to allow placement of the materials as described above. When the resin has been injected and cured the injector is removed and the other steps described above carried out.

It will be noted that formation of the plug in the annulus of curable synthetic material enables hot taps to be made through the plug into the production tubing, due to the machinability of the resinous material when cured. Further, the nature of the plug enables it to be prestressed to resist the full pressure in the production tubing.

We claim:
1. A method of forming a pressure resistant plug in an elongate annulus defined between a production casing of a multi-tubular well and the production tubing of the well within the production casing, the method comprising the steps of:
   (1) securing hot tapping apparatus to the outer tubular member;
   (2) forming a hot tapping in the outer tubular member;
   (3) injecting, through the hot tapping and into the annulus, a first quantity of curable synthetic material; and
   (4) allowing the first quantity of curable synthetic material to cure in the annulus;
   the method further comprising the steps of blocking the production tubing by boring through the cured synthetic material and the production tubing at the hot tapping in the production casing to form a first hot tapping into the production tubing; forming a second hot tapping through the production casing and the production tubing at a position spaced above or below along the well from the first hot tapping; placing a through-bar across the production tubing at the upper of the hot tapping; injecting tubing blocking material at the lower hot tapping; and allowing the blocking material to lodge against the through-bar and to block the production tubing.

2. A method as claimed in claim 1 wherein the second hot tapping is continued into the production tubing opposite the point of entry and the through-bar when inserted is supported at both sides of the production tubing.

3. A method as claimed in claim 1 wherein the tubing blocking material comprises, in order of injection, metal balls, non-metallic balls and plastics net, rubber string and buoyant lost circulation material.

4. A method as claimed in claim 3 wherein the tubing blocking material includes plastics balls injected before the metal balls.

5. A method as claimed in claim 1 wherein, prior to injection into the annulus, a barrel is inserted into the annulus to push the production tubing away from the hot tapping in the production casing.

6. A method as claimed in claim 1 wherein the hot tapping apparatus comprises a boring machine and a tool holder having a central bore, being adapted for detachable sealing connection of the boring machine and then an injection tool to the tool holder at one end of the bore and having a face at the other end of the bore adapted for sealing abutment with the outer tubular member, a saddle seal surrounding the said other end of the bore and a valve for closing off the tool; and wherein during the method of the tool holder is secured to the outer tubular member with the saddle seal sealing the said other end of the bore to the outer tubular member, the valve is opened, the boring machine is operated to advance a cutter through the bore to cut the hot tapping in the outer tubular member and to withdraw the cutter, the valve is closed, the boring machine is detached and replaced by the injection tool, the valve is opened and the curable synthetic material is injected from the injection tool into the annulus.

7. A method of forming a plug resistant to leakage of high pressure fluid in an elongate annulus within an outer tubular member, a partial obstruction being formed in the annulus at a location remote from both ends of the annulus, the method comprising the steps of:
(a) securing hot tapping apparatus to the outer tubular member;
(b) forming a hot tapping in the outer tubular member above the partial obstruction;
(c) injecting, through the hot tapping into the annulus, particulate foundation material dimensioned to lodge against the partial obstruction;
(d) injecting, through the hot tapping and into the annulus, a first quantity of curable synthetic material;
(e) allowing the first quantity of curable synthetic material to cure in the annulus; and
(f) after step (e), prestressing the plug to seal it against the leakage of the high pressure fluid.

8. A method of forming a pressure resistant plug in an elongate annulus within an outer tubular member, a partial obstruction being formed in the annulus at a location remote from both ends of the annulus, the method comprising the steps of:
(a) securing hot tapping apparatus to the outer tubular member;
(b) forming a hot tapping in the outer tubular member above the partial obstruction;
(c) injecting, through the hot tapping into the annulus, particulate foundation material, including metal balls of a number of different sizes, dimensioned to lodge against the partial obstruction, balls of largest size being injected first followed by balls of successively smaller sizes;
(d) injecting, through the hot tapping and into the annulus, a first quantity of curable synthetic material; and
(e) allowing the first quantity of curable synthetic material to cure in the annulus.

9. A method as claimed in claim 8, wherein the foundation material includes fibrous metal material, the step of injecting foundation material comprising the step of injecting the fibrous material after the metal balls and before the curable synthetic material.

10. A method of forming a plug resistant to leakage of high pressure fluid in an elongate annulus within an outer tubular member, the method comprising the steps of:
(1) securing hot tapping apparatus to the outer tubular member;
(2) forming a hot tapping in the outer tubular member;
(3) injecting, through the hot tapping and into the annulus at a position remote from both ends of the annulus, a first quantity of curable synthetic material;
(4) allowing the first quantity of curable synthetic material to cure in the annulus; and
(5) after step (4), prestressing the plug to seal it against the leakage of the high pressure fluid.

11. A method as claimed in claim 10, wherein the step of prestressing the plug includes a step of applying a pressure to the plug externally of the high pressure fluid.

12. A method as claimed in claim 11, wherein the step of prestressing the plug includes the step of prestressing the plug via pressure applied thereto by the high pressure fluid.

13. A method as claimed in claim 11, wherein the step of prestressing the plug includes the step of injecting through the hot tapping and into the annulus, a second quantity of synthetic curable material and/or a first quantity of lost circulation material under the externally applied pressure after the first quantity of curable synthetic material has cured.

14. A method as claimed in claim 13, further comprising the step of injecting into the annulus a second quantity of lost circulation material prior to the step of injecting the first quantity of curable synthetic material.

15. A method as claimed in claim 13, wherein the first and second quantities of curable material are each formed of plasticised epoxy resin.

16. A method as claimed in claim 13, wherein the first and second quantities of curable material are each formed of two component material and the components are mixed on injection.

17. A method as in claim 10, wherein the step of prestressing the plug includes a step of prestressing the plug via pressure applied thereto by the high pressure fluid.

18. A method as in claim 17, further comprising the step of injecting into the annulus a second quantity of lost circulation material prior to the step of injecting the first quantity of curable synthetic material.

19. A method as claimed in claim 10, further comprising the step of injecting into the annulus foundation material prior to the step of injecting the first quantity of curable synthetic material.

20. A method as claimed in claim 19, wherein the foundation material is quicksetting material, which is mixed on injection thereof.

21. A method as claimed in claim 10, wherein the first quantity of curable synthetic material is plasticised epoxy resin.

22. A method as claimed in claim 10, wherein the first quantity of curable synthetic material is a two component material and the components are mixed on injection.

* * * * *